United States Patent
Nedelec et al.

[15] 3,691,215
[45] *Sept. 12, 1972

[54] THE PREPARATION OF 7α-METHYL-Δ$^{4,9,11}$-ESTRATRIENES

[72] Inventors: Lucien Nedelec, Clichy-sous-Bois, Seine-Saint Denis; Jean-Claude Gasc, Bondy, Seine-Saint Denis, both of France

[73] Assignee: Roussel-Uclaf, Paris, France

[ * ] Notice: The portion of the term of this patent subsequent to June 21, 1983, has been disclaimed.

[22] Filed: Aug. 31, 1966

[21] Appl. No.: 576,240

[30] Foreign Application Priority Data

Sept. 3, 1965 France..........................30381

[52] U.S. Cl. ............260/397.45, 23/364, 260/239.5, 260/239.55 R, 260/346.1, 260/397.3, 260/397.5, 260/488 B, 260/586 H, 424/243
[51] Int. Cl............................................C07c 169/08
[58] Field of Search.......................260/397.45, 397.3

[56] References Cited

UNITED STATES PATENTS

| | | | |
|---|---|---|---|
| 3,576,828 | 4/1971 | Anner et al.............. | 260/397.3 |
| 3,453,267 | 7/1969 | Vignau et al. ......... | 260/239.55 |
| 3,257,278 | 6/1966 | Nomine et al. .............. | 167/74 |

OTHER PUBLICATIONS

Campbell et al., Steroids, Vol. 1, Mar. 1963, pp. 317–324.
Velluz et al., Comptes Rendus Acad. Sc. Paris, V. 257, No. 3, pp. 569–570.
Anner et al., Chimia, Vol. 20, Dec., 1966, pp. 434–435.

*Primary Examiner*—Joseph Rebold
*Assistant Examiner*—Ethel G. Love
*Attorney*—Hammond & Littell

[57] ABSTRACT

The preparation of 7α-methyl-Δ$^{4,9,11}$-estratrienes of the formula

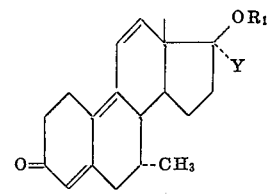

wherein $R_1$ is selected from the group consisting of hydrogen and an acyl radical of an organic carboxylic acid of one to 18 carbon atoms and Y is selected from the group consisting of unsaturated aliphatic and halogenated unsaturated aliphatic radicals of two to four carbon atoms.

14 Claims, No Drawings

THE PREPARATION OF 7α-METHYL-Δ$^{4,9,11}$-ESTRATRIENES

The invention further relates to novel therapeutic compositions.

The 7α-methyl-Δ$^{4,9,11}$-estratrienes of formula II are endowed with outstanding hormonal properties. For example, 7α, 17α-dimethyl-Δ$^{4,9,11}$-estratriene-17β-ol-3-one has marked androgenic and very intense anabolic properties and in contrast to the 17-alkyl androgenic and anabolic compounds without a 7α-methyl substituent, it manifests only a very weak hepatonocivity. After a prolonged treatment of rabbits, the amount of serous transaminases were found only slightly modified and therefore, it can be concluded that the danger of a hepatic cytolysis is practically discarded. Also, 7α-methyl- 17α-ethynyl-Δ$^{4,9,11}$-estratriene-17β-ol-3-one has very marked hypocholesterolemiant properties and a very attenuated degree of estrogenic activity, which makes it possible to utilize the product for a prolonged period of time in therapy for humans without any undesirable secondary effects. In particular, the rat unit determined by the Allen-Doisy test is amply superior with 5 mg. Furthermore, the said product possesses a favorable action on the reduction of fecundity in the animal and displays very intense anti-estrogenic properties. Therefore, the insertion of the methyl in the 7α-position in the molecule of 17α-hydrocarbonyl-β $^{4,9,11}$-estratriene-17β-OR$_1$-3-ones has the effect of substantially modifying the nature of the physiological activity in the basic molecule. The intensity of the action is not found modified by the insertion of this substituent, but the nature of the effect is found changed by the obvious attenuation or disappearance of the androgenic or estrogenic effects depending upon the character of the hydrocarbon substituent in the 17α-position.

OBJECTS OF THE INVENTION

It is an object of the invention to provide the novel 7α-methyl-Δ$^{4,9,11}$-estratrienes of formula I.

It is another object of the invention to provide a novel process for the preparation of 7α-methyl-Δ$^{4,9,11}$-estratrienes of formula II.

It is a further object of the invention to provide novel therapeutic compositions.

These and other objects and advantages of the invention will become obvious from the following detailed description.

THE INVENTION

The novel 7α-methyl-Δ$^{4,9,11}$-estratrienes of the invention have the formula

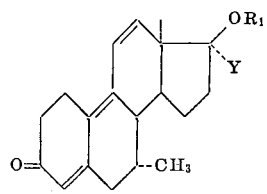

wherein R$_1$ is selected from the group consisting of hydrogen and an acyl radical of an organic carboxylic acid of one to 18 carbon atoms and Y is selected from the group consisting of unsaturated aliphatic and halogenated unsaturated aliphatic radicals of two to four carbon atoms.

The acyl radical of the organic carboxylic acid having one to 18 atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids, such as undecylenic acid and oleic acid; cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids, such as furane-2-carboxylic acid, 5-terbutylfurane-2-carboxylic acid, 5-bromofurane-2-carboxylic acid and nicotinic acids; β-ketoalkanoic acids, such as acetylacetic acid, propionylacetic acid and butyrylacetic acid; amino acids, such as diethylaminoacetic acid and aspartic acid.

Examples of Y are alkenyl radicals such as vinyl, allyl, etc.; alkynyl radicals such as 1'-propynyl, 2'-propynyl, ethynyl, butynyl, etc., and halogenated alkenyl and alkynyl such as trifluorovinyl, chloroethynyl, etc.

Examples of compounds of formula I with valuable physiological properties are 17α-vinyl-7α-methyl-Δ$^{4,9,11}$-estratriene- 17β-ol-3-one endowed with anabolisant properties; 17α-allyl-7α-methyl-Δ$^{4,9,11}$-estratriene-17β-ol-3-one endowed with progestomimetic properties; 17α-(1'-propynyl)-7α-methyl-Δ$^{4,9,11}$-estratriene-17β-ol-3-one endowed with claudogenic properties; 17α-(2'-propynyl)-7α-methyl-Δ$^{4,9,11}$-estratriene-17β-ol-3-one endowed with hypophysial inhibitive properties; 17α-(trifluorovinyl)-7α-methyl-Δ$^{4,9,11}$-estratriene-17β-ol-3-one endowed with progestomimetic properties; 17β-acetoxy-17α-ethynyl-7α-methyl-Δ$^{4,9,11}$-estratriene-3-one endowed with hypercholesterolemiant properties; and 17β-capryloxy-17α-ethynyl-7α-methyl-Δ$^{4,9,11}$-estratriene-3-one endowed with anti-estrogenic properties.

The novel process of the invention for the preparation of 7α-methyl-Δ$^{4,9,11}$-estratrienes of the formula

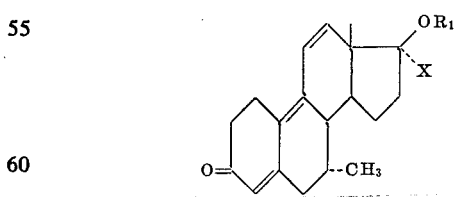

wherein R$_1$ is selected from the group consisting of hydrogen and an acyl radical of an organic carboxylic acid of one to 18 carbon atoms and X is selected from the group consisting of alkyl of one to seven carbon atoms and unsaturated aliphatic and halogenated unsaturated aliphatic radicals of two to four carbon atoms comprises subjecting a 5-lower alkylene ketal-17β-acyloxy-desA-Δ⁹⁽¹¹⁾-estrene wherein the acyloxy is derived from an organic carboxylic acid of one to 18 carbon atoms to hydration to form the corresponding 5-lower alkylene ketal-17β-acyloxy-des-A-estrane-11 α-ol, subjecting the latter to acid hydrolysis to form 17β-acyloxy-des-A-estrane-11α-ol-5-one, reacting the latter with a formylation agent to form 11α-formyloxy-17β-acyloxy-des-A-estrane-5-one, brominating the latter to form 6ξ-bromo-11α-formyloxy-17β-acyloxy-des-A-estrane-5-one, dehydrobrominating the latter to form 11α-formyloxy-17β-acyloxy-des-A-Δ⁶-estrene-5-one, which can be saponifyed under alkaline conditions to form 17β-acyloxy-des-A-Δ⁶-estrene-11α-ol-5-one, reacting the latter or the 11α-formyloxy derivative with a methyl magnesium halide in the presence of a copper salt to form 7α-methyl-17β-acyloxy-des-A-estrane-11α-ol-5-one, reacting the latter with an esterifying derivative of an organic sulfonic acid to form 7α-methyl-11α-organosulfonyloxy-17β-acyloxy-des-A-estrane-5-one, reacting the latter with a lithium halide in the presence of a dilower alkyl formamide to form 7α-methyl-17β-acyloxy-des-A-Δ⁹-estrene-5-one, saponifying under alkaline conditions to form 7α-methyl-des-A-Δ⁹-estrene-17β-ol-5-one, oxidizing the latter to form 7α-methyl-des-A-Δ⁹-estrene-5,17-dione, reacting the latter with a secondary amine to form the corresponding 5-enamino-7α-methyl-des-A-Δ⁵⁽¹⁰⁾,⁹⁽¹¹⁾-estradiene-17-one, condensing the latter with 1,3-dichlorobutene-2 to form 3-chloro-7α-methyl-4,5-seco-Δ²,⁹-estradiene-5,17-dione, hydrolyzing the latter under acid conditions to form 7α-methyl-4,5-seco-Δ⁹-estrene-3,5,17-trione, cyclizing the latter in the presence of a secondary amine to form 3-enamino-7α-methyl-Δ³,⁵⁽¹⁰⁾,⁹⁽¹¹⁾-estratriene-17-one, subjecting the latter to acid hydrolysis to form 7α-methyl-Δ⁵⁽¹⁰⁾,⁹⁽¹¹⁾-estradiene-3,17-dione, reacting the latter with a ketalizing agent to form 3-dialkoxy-7α-methyl-Δ⁵⁽¹⁰⁾,⁹⁽¹¹⁾-estradiene-17-one, reacting the latter with an organo metal compound to form 3-dialkoxy-7α-methyl-17α-X-Δ⁵⁽¹⁰⁾,⁹⁽¹¹⁾-estradiene-17β-ol, wherein X has the above definition, subjecting the latter to acid hydrolysis to form 7α-methyl-17α-X-Δ⁵⁽¹⁰⁾,⁹⁽¹¹⁾ᴮ-estradiene-17β-ol-3-one and reacting the latter with a substituted p-benzoquinone to form 7α-methyl-17α-X-Δ⁴,⁹,¹¹-estratriene-17β-ol-3-one, which may be reacted with an acylating agent of an organic carboxylic acid of one to 18 carbon atoms to form 7α-methyl-17α-X-17β-acyloxy-Δ⁴,⁹,¹¹-estratriene-3-one. The reaction scheme is illustrated in Table I.

TABLE I

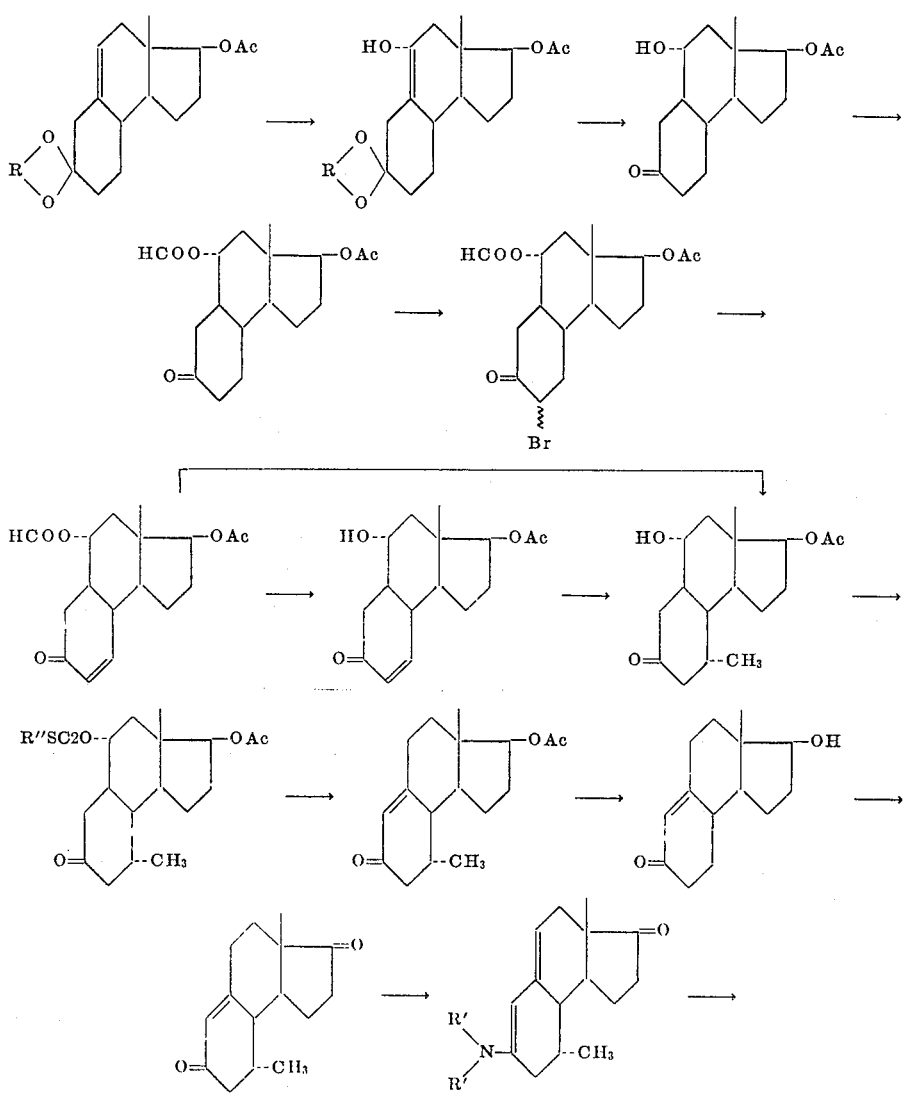

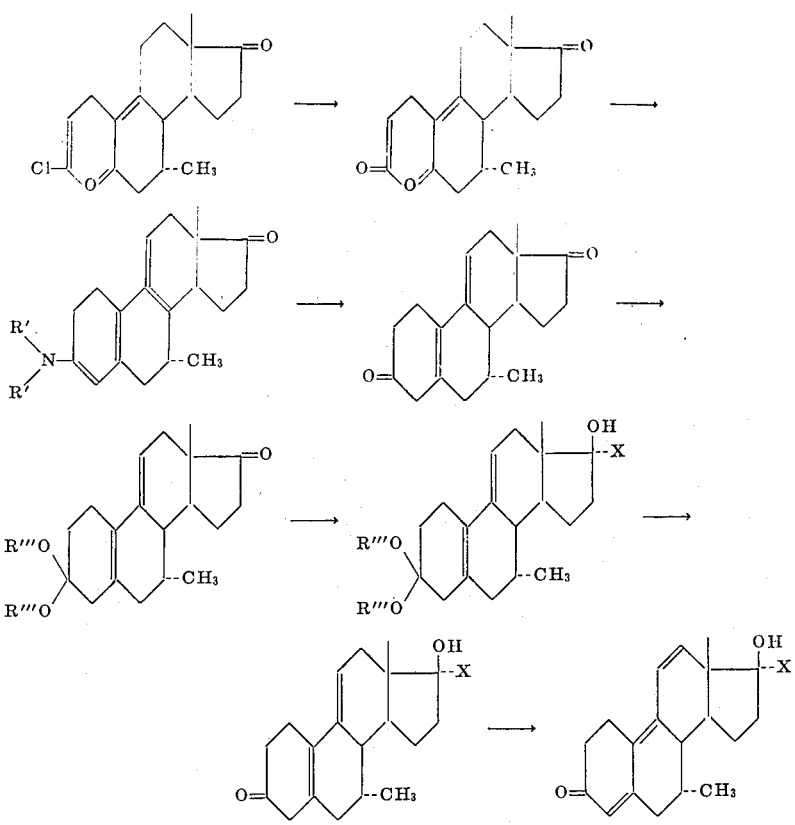

Wherein R is a lower alkylene, Ac is an acyl radical of an organic carboxylic acid of 1 to 18 carbon atoms, R'' is an organic radical, the R'''s may be lower alkyl or together with the nitrogen to which they are attached form a 5- to 6-member heterocyclic ring, R'''s are lower alkyl and X has the above definition.

A preferred mode of the process of the invention comprises reacting 5-ethylenedioxy-17β-benzoyloxy-des-A- $\Delta^{9(11)}$-estrene with diborane in the presence of an ether such as tetrahydrofuran or ethyl ether followed by treatment with hydrogen peroxide to form 5-ethylenedioxy-17β-benzoyloxy-des-A-estrane-11α-ol, treating the latter with a mineral acid such as hydrochloric acid in a lower aqueous alkanol to form 17β-benzoyloxy-des-A-estrane-11α-ol-5one, -ol-5-one, reacting the latter with formic acid at elevated temperatures to form 11α-formyloxy-17β-benzoyloxy-des-A-estrane-5-one, reacting the latter with bromine in an organic solvent such as chloroform, dioxane, acetic acid or dimethylformamide to form 6ξ-bromo-11α-formyloxy-17β-benzoyloxy-des-A-estrane-5-one, reacting the latter with a mixture of lithium carbonate and lithium bromide to form 11α-formyloxy-17β-benzoyloxy-des-A-$\Delta^6$-estrene-5-one, saponifying the latter with an alkali metal carbonate or bicarbonate such as potassium carbonate in an aqueous alkanol at elevated temperatures to form 17β-benzoyloxy-des-A-$\Delta^6$-estrene-11β-ol-5-one, reacting the latter with methyl magnesium bromide in an ether such as tetrahydrofuran in the presence of a cuprous halide such as cuprous chloride to form 7α-methyl-17β-benzoyloxy-des-A-estrane-11α-ol-5-one, reacting the latter with an alkyl or aryl sulfonic acid chloride such as methane sulfonyl chloride to form 7α-methyl-11α-organosulfonyloxy-17β-benzoyloxy-des-A-estrane-5-one, reacting the latter with lithium bromide in the presence of dimethylformamide to form 7α-methyl-17β-benzoyloxy-des-A-$\Delta^9$-estrene-5-one, saponifying the latter with an alkali metal hydroxide such as potassium hydroxide to form 7α-methyl-des-A-$\Delta^9$-estrene-17β-ol-5-one, oxidizing the latter with chromic acid anhydride to form 7α-methyl-des-A-$\Delta^9$-estrene-5,17-dione, reacting the latter with a secondary amine such as pyrrolidine, piperidine, morpholine or dilower alkyl amines such as diethylamine to form the corresponding 5-enamino-7α-methy-des-A-$\Delta^{5(10),9(11)}$-estradiene-17-one, condensing the latter with 1,3-dichlorobutene-2 in dimethylformamide in the presence of an alkali metal iodide such as potassium iodide to form 3-chloro-7α-methyl-4,5-seco-$\Delta^{2,9}$-estradiene-5,17-dione, hydrolyzing the latter in the presence of a strong mineral acid such as concentrated sulfuric acid to form 7α-methyl-4,5-seco$\Delta^9$-estrene-3,5,17-trione, cyclizing the latter in the presence of pyrrolidine to form 3-pyrrolidyl-7α-methyl-$\Delta^{3,5(10), 9(11)}$-estratriene-17-one, hydrolyzing the latter with acetic acid at room temperature in the absence of air to form 7α-methyl-$\Delta^{5(10),9(11)}$-estradiene-3,17-dione, reacting the latter with a lower alkanol such as methanol in the presence of hydrochloric acid to form 3-dilower alkoxy-7α-methyl-$\Delta^{5(10),9(11)}$-estradiene-17-one, reacting the latter with an organometal derivative with metals such as lithium, cadmium, magnesium, sodium or potassium, such as potassium acetylide or methyl magnesium bromide to form 3-dilower alkoxy-7α -methyl-17α-X-$\Delta^{5(10),9(11)}$-estradiene-17β-ol, hydrolyzing the latter with aqueous acetic acid to form 7α-methyl-17α-X-$\Delta^{5(10),9(11)}$-estradiene-17β-ol-3-one and reacting the latter with a substituted p-benzoquinone such as 2,3-dichloro-5,6-dicyano-p-benzoquinone,2,3-dibromo- 5,6-dicyano-p-benzoquinone, 2,3,5,6-tetrachloro-p-benzoquinone, 2,3-dicyano-5-chloro-p-benzoquinone or 2,3-dicyano-p-benzoquinone at room temperature to form 7α-methyl-17α-X-Δ$^{4,9,11}$-estratriene-3-one.

The novel therapeutic compositions of the invention for warm-blooded animals are comprised of a 7α-methyl-Δ$^{4,9,11}$estratriene of the formula

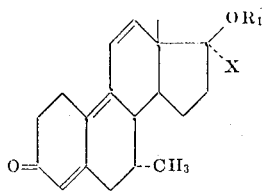

wherein $R_1$ is selected from the group consisting of hydrogen and an acyl radical of an organic carboxylic acid of one to 18 carbon atoms and X is selected from the group consisting of alkyl of one to seven carbon atoms and unsaturated aliphatic and halogenated unsaturated aliphatic radicals of two to four carbon atoms and a major amount of a pharmaceutical carrier. The compositions may be prepared in the form of injectable or drinkable solutions or suspensions, in the form of ampoules or multiple dose flacons, in the form of implants, tablets, coated tablets, sublingual tablets and suppositories. The said compositions may be administered orally, perlingually, transcutaneously or rectally and the usual useful dose is 0.001 to 0.03 mg/kg per day in the adult, depending upon the mode of administration.

17α-ethynyl-7α-methyl-Δ$^{4,9,11}$-estratriene-17β-ol-3-one is useful for the treatment of hypoestrogensis in women or it can be used to reduce the amount of fecundity in women as well as in the breeding of animals.

In the following examples, there are described several preferred embodiments to illustrate the invention. However, it should be understood that the invention is not intended to be limited to the specific embodiments.

EXAMPLE I

Preparation of 7α-methyl-17α-ethynyl-Δ$^{4,9,11}$-estratriene-17β-ol-3-one

Step A: Preparation of 11α-formyloxy-17β-benzoyloxy-des-A-estrane-5-one

1. Preparation of diborane:

1.2 liters of the etherate of boron trifluoride were introduced into 1.2 liters of the dimethyl ether of diethylene glycol. The mixture was purged by means of a stream of nitrogen, then within the space of one hour and at room temperature, 162 gm of finely ground sodium borohydride were introduced and the mixture was heated at a temperature of 40° C. for 1 hour. The diborane was liberated with 3.6 liters of tetrahydrofuran. Thus a solution of diborane was obtained titrating 8.3 to 9.8 gm per 100 cc.

2. Hydration:

Into 3.6 liters of the diborane solution, prepared as described above, 256 gm of 5-ethylenedioxy-17β-benzoyloxy-des-A-Δ$^{9(11)}$-estrene, described in U.S. Pat. No. 3,120,544 were introduced and allowed to stand at room temperature for ½ hour. Thereafter the mixture was cooled to a temperature of −5° C. Slowly 350 cc of water were added thereto followed by the addition of the following mixture:

| | |
|---|---|
| 36° Be sodium hydroxide solution | 350 cc |
| Water | 350 cc |
| Ethanol | 1050 cc |

Next, 1.8 liters of 110 volume hydrogen peroxide were slowly added to the reaction mixture and the mixture was agitated for 1 hour at a low temperature. The mixture was then poured into a saturated aqueous solution of sodium chloride and the liquid phase was extracted with methylene chloride. The extracts were washed with a saturated solution of sodium chloride and with water, then dried and evaporated to dryness under vacuum. The residue obtained was purified by trituration in isopropyl ether, thus obtaining 213.5 gm of 5-ethylenedioxy-17β-benzoyloxy-des-A-estrane-11α-ol. The product obtained had a melting point of 152° C and a specific rotation $[\alpha]^{20}_D = +29°$ (c = 1 percent in chloroform).

The product is colorless, insoluble in water and slightly soluble in isopropyl ether.

3. Hydrolysis:

330 gm of 5-ethylenedioxy-17β-benzoyloxy-des-A-estrane-11α-ol were dissolved in 1,650 cc of ethanol while heating at a temperature of 60° C. Then 330 cc of N hydrochloric acid were introduced into the solution, which was heated at reflux for ½ hour under agitation. Thereafter, the solution was cooled to room temperature, poured into water and extracted with methylene chloride.

The extracts were washed first with a saturated aqueous solution of sodium bicarbonate, then with water, dried, vacuum filtered, again washed with water and evaporated to dryness. The residue was dissolved in anhydrous ether under reflux and the crystallization was initiated. The crystallizing mixture was left in the refrigerator overnight, then vacuum filtered. The crystals were washed with ether and dried to obtain 240 gm of 17β-benzoyloxy-des-A-estrane-11α-ol-5-one, having a melting point of 129°–130° C.

The product was colorless, insoluble in water and in dilute aqueous acids and alkalis, and soluble in alcohol and ether.

4. Formylation:

2.5 gm of 17β-benzoyloxy-des-A-estrane-11α-ol-5-one were introduced into 12.5 cc of 98 percent formic acid and the solution was heated for ½ hour at a temperature of 80° C. After the solution had been cooled, it was poured into a water-ice mixture, agitated for several minutes, then vacuum filtered. The residue was washed with water and dried under vacuum.

The residue obtained was recrystallized from isopropanol, and about 2.5 gm of 11α-formyloxy-17β-benzoyloxy-des-A-estrane-5-one were obtained. The product had a melting point of 135° C and a specific rotation $[\alpha]^{20}_D = +10.7°$ (c = 0.7 percent in methanol) and +8.6° (c = 0.44 percent in chloroform).

The product was colorless, insoluble in water and in dilute aqueous acids. It was recrystallized from isopropanol and isopropyl ether.

Analysis: $C_{22}H_{26}O_5$; molecular weight = 370.43
Calculated: C 71.33% H 7.07%
Found: 71.6 7.1

Step B: Preparation of 11α-formyloxy-17β-benzoyloxy-des-A-Δ$^6$-estrene-5-one 1. Bromination:

At room temperature, 100 gm of 11α-formyloxy-17 β-benzoyloxy-des-A-estrane-5-one were dissolved in 1 liter of anhydrous dioxane. Within the space of 5 minutes, 460 cc of a solution containing 10 percent of bromine in dioxane were added thereto, and the solution was agitated for several minutes after the introduction had been completed.

Thereafter, the solution was poured over an ice-water mixture, agitated and vacuum filtered. The residue was washed with water and dried under vacuum. Thus, 122 gm of 6ξ-bromo-11α-formyloxy-17β-benzoyloxy-des-A-estrane-5-one were obtained. The product had a melting point of about 94° C. and was used as such for the following step.

2. Dehydrobromination 122 gm of lithium bromide and 244 gm of lithium carbonate were introduced into 1,220 cc of anhydrous dimethylformamide. 122 gm of 6ξ-bromo-11α-formyloxy-17β-benzoyloxy-des-A-estrane-5-one obtained in the preceding, were added and the suspension was heated at about 106° C for 3 hours under agitation.

Thereafter, the reaction mixture was cooled to room temperature and poured into the following mixture:

| | |
|---|---|
| Water | 12 liters |
| Acetic acid | 300 cc |
| Sodium chloride | 160 gm | and agitated for ¼ hour.

The reaction mixture was then vacuum filtered. The residue was washed with water, taken up in methylene chloride and filtered. The organic phase was washed with water, dried and evaporated to dryness under vacuum. The residue was triturated in anhydrous ether, iced overnight, then vacuum filtered. The residue was washed with ether and dried under vacuum.

After recrystallization from an ethyl acetate-isopropyl ether mixture, 45.9 gm of 11α-formyloxy-17 β-benzoyloxy-des-A-Δ$^6$-estrene-5-one were obtained. The product had a melting point of 137°–138° C and a specific rotation $[\alpha]^{20}_D = -19.2°$ (c = 0.9 percent in chloroform).

The product was insoluble in water and in dilute aqueous acids and alkalis, slightly soluble in isopropyl ether, and soluble in alcohol and ethyl acetate.

Step C: Preparation of 17β-benzoyloxy-7α-methyl-des-A-estrane-11α-ol-5-one 70 mg of cuprous chloride were introduced into a solution of 7 millimoles of methyl magnesium bromide in 15 cc of tetrahydrofuran. The reaction mixture was agitated for ¼ hour, cooled to a temperature of 0° C. and within the spaced of 2 minutes, 2 millimoles of 11α-formyloxy-17β-benzoyloxy-des-A-Δ$^6$-estrene-5-one, dissolved in 6 cc of tetrahydrofuran, were added thereto. The agitation was maintained at low temperature for several minutes, then the reaction mixture was poured into a mixture of water, ice and hydrochloric acid. Thereafter the mixture was extracted with methylene chloride. The extracts thus obtained were washed with water, dried and distilled to dryness under vacuum.

By subjecting the residue to chromatography through magnesium silicate and by elution with methylene chloride containing 0.5 percent of methanol, 194 mg of 17β-benzoyloxy-7α-methyl-des-A-estrane-11α-ol-5-one, were isolated. This product had, after recrystallization from a 2:4 mixture of ethyl acetate and isopropyl ether, a melting point of 155°–156° C and a specific rotation $[\alpha]^{20} = +20°$ (c = 0.75 percent in chloroform).

The product occurred in the form of small colorless rods, slightly soluble in ether and soluble in acetone, benzene and chloroform.

Analysis: $C_{22}H_{28}O_4$: molecular weight 356.44
Calculated:   C 74.13%   H 7.92%
Found:            74.0         8.0

The structure of 17β-benzoyloxy-7α-methyl-des-A-estrane-11α-ol-5-one was confirmed by reducing the same to 17β-benzoyloxy-7α-methyl-des-A-estrane-5α,11α-diol, prepared as described in the following:

0.356 gm of 17β-benzoyloxy-7α-methyl-des-A-estrane-11α-ol-5-one was dissolved in 8 cc of ethanol. 0.35 gm of Raney nickel containing 2 percent of palladium was added to the solution, which was then purged and agitated for a period of 6 hours under an atmosphere of hydrogen and at room temperature.

Thereafter, the catalyst was eliminated by filtration. The filtrate was distilled to dryness under vacuum, and the residue was crystallized by the addition of a few drops of ether.

After trituration in isopropyl ether and after recrystallization from ethyl acetate, 0.178 gm of 17β-benzoyloxy-7α-methyl-des-A-estrane-5α,11α-diol was obtained, having a melting point of 154°C and a specific rotation $[\alpha]^{20}_D = +3.7°$ (c = 0.8 percent in chloroform).

The RMN spectra confirmed the α configuration of the methyl in the 7 position.

The product was colorless, slightly soluble in ether and soluble in alcohol, acetone, benzene and chloroform.

17β-benzoyloxy-7α-methyl-des-A-estrane-11α-ol-5-one may also be prepared by starting with 17β-benzoyloxy-des-A-Δ$^6$-estrenene-11α-ol-5-one, obtained by saponification of the corresponding formate. The work is carried out in the following manner:

1 gm of 11α-formyloxy-17β-benzoyloxy-des-A-Δ$^6$-estrene-5-one was introduced into 15 cc of methanol and the solution was heated to reflux. Next, 5 cc of a normal aqueous solution of potassium bicarbonate were rapidly added thereto, and the temperature was maintained for 5 minutes at about 70° C. Thereafter, the reaction mixture was cooled, neutralized by the addition of acetic acid, diluted with water and extracted with methylene chloride.

The extracts were successively washed first with water, then with an aqueous solution of sodium chloride, dried and distilled to dryness to obtain raw 17β-benzoyloxy-des-A-Δ$^6$-estrene-11α-ol-5-one.

17β-benzoyloxy-des-A-Δ$^6$-estrene-11α-ol-5-one can also be prepared by starting with 17β-benzoyloxy-des-A-estrane-11α-ol-5-one. The work is accomplished in the following manner:

(a) Bromination 3 gm of 17β-benzoyloxy-des-A-estrane-11α-ol-5-one were dissolved in 30 cc of anhydrous chloroform. The solution cooled to about 5° C. Next, under agitation, 9.5 cc of a solution prepared by starting with 15.25 gm of bromine in 100 cc of anhydrous chloroform were introduced dropwise while cooling to 0° C. The agitation was maintained for several minutes after the introduction had been completed. Then, the reaction mixture was poured into water, decanted and extracted with methylene chloride.

The extracts were successively washed first with a saturated aqueous solution of sodium bicarbonate, then with water and lastly with an aqueous solution of sodium chloride, and distilled to dryness under vacuum. The residue was taken up with ether and allowed to stand for several hours at room temperature. Thereafter, the residue was vacuum filtered, washed with ether and triturated in ethyl acetate to obtain 1 gm of 6β-bromo-17β-benzoyloxy-des-A-estrane-11α-ol-5-one having a melting point of 225°–228° C. and a specific rotation $[\alpha]^{20}_D = -160°$ (c = 0.8 percent in chloroform).

The product was colorless, slightly soluble in ether and soluble in chloroform.

(b) Dehydrobromination

A mixture consisting of 1 gm of lithium bromide, 2 gm of lithium carbonate and 10 cc of dimethylformamide was heated to a temperature of 100° C. Then 1 gm of 6β-bromo-17β-benzoyloxy-des-A-estrane-11α-ol-5-one was introduced into this mixture and agitated for 3 hours at about 100° C. Thereafter, the reaction mixture was poured into a mixture of water, ice and acetic acid. Sodium chloride was added thereto and the mixture was agitated for ½ hour. The aqueous phase was decanted and the resultant residue was dissolved in methylene chloride.

The solution was successively washed first with an aqueous solution of sodium bicarbonate, then with water and lastly with an aqueous solution of sodium chloride, then dried and distilled to dryness under vacuum. The product thus obtained was subjected to chromotography through silica gel and eluted with methylene chloride containing increasing percentages of methanol.

The fraction eluted with methylene chloride containing 1.5 percent of methanol was recovered, and 0.68 gm of 17β-benzoyloxy-des-A-Δ⁶-estrene-11α-ol-5-one was isolated.

The product was colorless, slightly soluble in ether and isopropyl ether, soluble in ethyl acetate and alcohols.

Infrared Spectra (chloroform)

Presence of a free hydroxyl and of a ketonic group at 1,670 cm⁻¹.

Ultraviolet spectra (ethanol)
  ηmax. 230–231 mμ ξ=23,000
  ηmax. 273–274 mμ ξ= 1,020
  λmax. 280–281 mμ ξ= 780

17β-benzoyloxy-des-A-Δ⁶-estrene-11α-ol-5-one was used to prepare 17β-benzoyloxy-7α-methyl-des-A-estrane-5-one as follows:

100 mg of cuprous chloride were introduced into a solution of 0.99 N methyl magnesium bromide in tetrahydrofuran. The reaction mixture was agitated for ¼ hour at room temperature, diluted by addition of tetrahydrofuran and then rapidly cooled to a temperature of −4° C. Next, 2.05 gm of 17β-benzoyloxy-des-A-Δ⁶-estrene-11α-ol-5-one were added, and the agitation was maintained for 15 minutes after the introduction had been completed. The reaction mixture was poured into ice water containing concentrated hydrochloric acid, and extracted with methylene chloride. The extracts were successively washed first with water, then with an aqueous solution of sodium chloride, dried and distilled to dryness under vacuum. The residue was subjected to chromatography through magnesium silicate, followed by elution with methylene chloride containing 0.3 percent of methanol to obtain 1.2 gm of a crystallized product.

The recrystallization of the product obtained from methylene chloride with addition of a 2:1 mixture of ether and isopropyl ether furnished 1.07 gm of 17β-benzoyloxy-7α-methyl-des-A-estrane-11α-ol-5-one identical to the produce described above.

Step D: Preparation of 17β-benzoyloxy-7α-methyl-des-A-Δ⁹-estrene-5-one

1. Esterification 0.865 gm of 17β-benzoyloxy-7α-methyl-des-A-estrane-11α-ol-5-one was dissolved in 5.2 cc of anhydrous pyridine. The solution was cooled to about 0° C., then 0.52 cc of methanesulfonyl chloride was added dropwise thereto. The reaction mixture was then agitated for 2 more hours at room temperature, then for 2 more hours at room temperature. After dilution with water, the reaction mixture was allowed to stand for 1 hour at room temperature, then vacuum filtered. The residue was washed with water and dried under vacuum to obtain 1.037 gm of 11α-methanesulfonyloxy-17β-benzoyloxy-7α-methyl-des-A-estrane-5-one, which after recrystallization from ethanol, had a melting point of 214°–215° C.

The product occurred in the form of colorless needles, slightly soluble in alcohol and soluble in chloroform.

2. Dehydration 2.36 gm of 11α-methanesulfonyloxy-7α-methyl-17β-benzoyloxy-des-A-estrane-5-one, and 3.95 gm of lithium bromide were introduced into 35 cc of anhydrous dimethylformamide, and the mixture was agitated for 5 hours at a temperature of 120° C. Thereafter, it was cooled, poured into water, agitated for ½ hour and vacuum filtered. The residue was washed with water and dried under vacuum. The resultant product, successively triturated first in ether and then in ethyl acetate, supplied 1.412 gm of 17β-benzoyloxy-7α-methyl-des-A-Δ⁹-estrene-5-one which, after recrystallization from ethyl acetate, had a melting point of 182°–183° C., then 200° C., after having recrystallized, and a specific rotation $[\alpha]^{20}_D = +49.6°$ (c = 0.48 percent in chloroform).

Ultraviolet Spectra (ethanol)

λmax. 236 mμ ξ= 26,200

Infrared Spectra (chloroform)

Presence of a ketonic group at 1,667 cm⁻¹
Presence of a double bond at 1,615 cm⁻¹
Presence of a benzoate group at 1,712 cm⁻¹

The product occurred in the form of small colorless rods, insoluble in water, very slightly soluble in ether, slightly soluble in alcohol and soluble in chloroform.

Analysis:   $C_{22}H_{26}O_3$        molecular weight = 338.43
Calculated:   C 78.07%   H 7.74%
Found:            78.1        7.8

Step E: Preparation of 7α-methyl-des-A-Δ⁹-estrene-17β-ol-5-one 0.272 gm of 17β-benzoyloxy-7α-methyl-des-A-Δ$^9$-estrene-5-one were introduced into 2.7 cc of methanol. 0.1 cc of a potassium hydroxide solution was added thereto, and the reaction mixture was heated at reflux for 1 hour under an atmosphere of nitrogen. Thereafter, the reaction mixture was poured into water and extracted with methylene chloride. The extracts were washed with water, dried and evaporated to dryness to obtain 0.185 gm of 7α-methyl-des-A-Δ$^9$-estrene-17β-ol-5-one with a melting point of 119°–120° C. The product was utilized as such for the next step in the synthesis.

The product occurred in the form of colorless prisms, insoluble in water and in dilute aqueous acids and alkalis, and soluble in most of the common organic solvents.

Step F: Preparation of 7α-methyl-des-A-Δ⁹-estrene-5,17-dione 10.7 gm of 7α-methyl-des-A-Δ$^9$-estrene-17β-ol-5-one were dissolved in 64 cc of acetone. The solution was agitated, cooled to about 0° C, then 12.3 cc of the following solution were added dropwise:

| | |
|---|---|
| Chromic acid anhydride | 67.5 gm |
| Sulfuric acid | 57.5 cc | and water in sufficient quantity to obtain a solution of 250 cc. The reaction mixture was agitated for 1 hour room temperature. Thereafter, the reaction mixture was poured into water. The solvent was removed. Ice was added to the mixture. The residue was vacuum filtered, washed with water and dried to obtain 8.205 gm of 7α-methyl-des-A-Δ$^9$-estrene-5,17-dione. The product, recrystallized from ethanol, had a melting point of 140°C and a specific rotation $[\alpha]^{20}_D = +96.5°$ (c = 0.45 percent in chloroform).

Ultraviolet Spectra (ethanol)

λ max. 240-241 mµ ξ= 13,400

The product was colorless, insoluble in water, in dilute aqueous acids and alkalis, and soluble in most of the usual organic solvents.

| Analysis: | $C_{15}H_{20}O_2$; | molecular weight – 232.31 |
|---|---|---|
| Calculated | C 77.55% | H 8.68% |
| Found: | 77.3 | 8.8 |

Step G: Preparation of 5-pyrrolidyl-7α-methyl-des-A-Δ$^{5(10),9(11)B}$-estradiene-17-one Under agitation and under an atmosphere of nitrogen, 51 mgm of 7α-methyl-des-A-Δ$^9$-estrene-5,17-dione were dissolved in 0.1 cc of pyrrolidine, then 1 cc of methanol was added thereto and the reaction mixture was heated for 10 minutes at a temperature of 60°–70 C. Next, the reaction mixture was cooled and evaporated to dryness to obtain 66 mgm of 5-pyrrolidyl-7α-methyl-des-A-Δ$^{5(10),9(11)}$-estradiene-17-one, having a melting point of about 55° C.

Ultraviolet Spectra (ethyl ether)

λmax. 284 mµ ξ= 9,975

The product was insoluble in water and in dilute aqueous acids and alkalis and soluble in most of the common organic solvents.

Step H. Preparation of 3-chloro-7α-methyl-4,5-seco-Δ$^{2,9}$-estradiene-5,17-dione While working under an atmosphere of nitrogen, 13.1 gm of 5-pyrrolidyl-7αmethyl-des-A-Δ$^{5(10),9(11)}$-estradiene-17-one were dissolved in 71.5 cc of a 10.9 percent potassium iodide solution in dimethylformamide. The solution was cooled to a temperature of about 0° C. Then 12.7 cc of 1,3-dichloro-2-butene were added thereto and the agitation was maintained for 2½ hours at the low temperature. Thereafter, the reaction mixture was diluted with water, heated at a temperature of 90° C for a period of two and a half hours, cooled and finally extracted with methylene chloride. The extracts were washed with water, dried and evaporated to dryness. The residue was subjected to chromatography through magnesium silicate with elutions with methylene chloride to obtain 14.4 gm of 3-chloro-7α-methyl-4,5-seco-Δ$^{2,9}$-estradiene-5,17-dione, which product was used as such for the next step in the synthesis.

Ultraviolet Spectra (ethanol)

λmax. 249 -250 mµ ξ= 9,450

The product was insoluble in water and in dilute aqueous acids and alkalis, and soluble in most of the usual organic solvents.

Step I: Preparation of 7α-methyl-4,5-seco-Δ⁹-estrene-3,5,17-trione

While working under an atmosphere of nitrogen, 14.4 gm of 3-chloro-7α-methyl-4,5-seco-Δ$^{2,9}$-estradiene-5,17-dione were dissolved in 70 cc of methylene chloride. The reaction mixture was cooled to about 0° C. Then 70 cc of sulfuric acid were added dropwise and the mixture was agitated for 15 minutes at a temperature of about 0° C. Thereafter, the reaction mixture was cooled to a temperature of −10° to −15° C and very slowly water was added. The mixture was then diluted with methylene chloride. The organic phase was separated, washed with water, dried and evaporated to dryness. The residue was subjected to chromatography through magnesium silicate with elutions with methylene chloride containing increasing amounts of acetone. The fractions, eluted with methylene chloride containing 2 and 3 percent of acetone, were combined, filtered and evaporated to dryness to obtain 8.338 gm of 7α-methyl-4,5-seco-Δ$^9$-estrene-3,5,17-trione, which was utilized as such for the next step in the synthesis.

Ultraviolet Spectra (ethanol)

λmax. 252 mµ ξ= 10,690

The product was insoluble in water, and in dilute aqueous acis and alkalis, and soluble in most of the usual organic solvents.

Step J: Preparation of 3-pyrrolidyl-7α-methyl-Δ$^{3,5(10),9(11)}$-estratriene-17-one While working under an atmosphere of nitrogen, 9.812 gm of 7α-methyl-4,5-seco-Δ$^9$-estrene-3,5,17-trione were dissolved in 45 cc of anhydrous methanol, then 4.5 cc of anhydrous pyrrolidine were added and the mixture was agitated for 20 hours. Thereafter, the reaction mixture was cooled for 1 hour at a temperature of −10° C. Then it was vacuum filtered. The residue was washed with iced methanol and dried to obtain 7.457 gm of 3-pyrrolidyl-7α-methyl-Δ$^{3,5(10),9(11)}$-estratriene-17-one, having a melting point of 156° C.

The product occurred in the form of needles, insoluble in water and in dilute aqueous acids and alkalis slightly soluble in methanol and ethanol, and soluble in ether, benzene and chloroform.

Step K: Preparation of 7α-methyl-Δ$^{5(10),9(11)}$-estradiene-3,17-dione

While working under an atmosphere of nitrogen, 7.777 gm of 3-pyrrolidyl-7α-methyl-Δ$^{3,5(10),9(11)}$-estratriene-17-one were dissolved in 15 cc of acetic acid; then at room temperature 200 cc of water were added and the reaction mixture was allowed to stand for 2 hours. Next the reaction mixture was iced for 1 hour and vacuum filtered. The residue was washed with water and dried to obtain 5.2 gm of 7α-methyl-Δ$^{5(10),9(11)}$-estradiene-3,17-dione. The product, passed through magnesium silicate and recrystallized from isopropyl ether, had a melting point of 141° C and a specific rotation $[\alpha]^{20}_D = +272°$ (c = 0.75 percent in chloroform).

Ultraviolet Spectra (ethanol)

λmax 241 mμ ξ= 19,050

The product occurred in the form of colorless needles, insoluble in water and in dilute aqueous acids and alkalis, and soluble in most of the common organic solvents.

Analysis: $C_{19}H_{24}O_2$; molecular weight = 284.38
Calculated: C 80.24%  H 8.50%
Found:        80.1     8.2

Step L: Preparation of 3,3-dimethoxy-7α-methyl-Δ$^{5(10),9(11)B\text{-}estradiene}$-17-one While working under an atmosphere of nitrogen, 0.5 gm of 7α-methyl-Δ$^{5(10),9(11)}$-estradiene-3,17-dione were dissolved in 2.5 cc of methanol. 0.125 cc of a 0.07 N hydrochloric acid solution in methanol was added and the reaction mixture was allowed to stand for 1 hour at room temperature. Next, the reaction mixture was placed in the refrigerator for 2 hours, then vacuum filtered. The residue was washed with water and dried to obtain 525 mgm of 3,3-dimethoxy-7α-methyl-Δ$^{5(10),9(11)}$-estradiene-17-one. After recrystallization from methanol, the product had a melting point of 159° C and a specific rotation $[\alpha]^{20}_D = +271°$ (c = 0.83 percent in chloroform).

Ultraviolet Spectra (ethanol)

λmax. 243 mμ ξ= 20,050

The product was colorless, insoluble in water and in dilute aqueous alkalis, and soluble in most of the common organic solvents.

Step M: Preparation of 3,3-dimethoxy-7α-methyl-17α-ethynyl-Δ$^{5(10),9(11)}$estradiene-17β-ol 105 cc of ammonia were cooled to −50° C and then 1.750 gm of potassium were added thereto under agitation and bubbling of inert gas and a current of acetylene was passed through the reaction mixture for 30 minutes. The precipitate obtained was diluted with 28 cc of ether and then 28 cc of ether and 7 gm of 3,3-dimethoxy-7α-methyl-Δ$^{5(10),9(11)}$-estradiene-17-one were added to the reaction mixture and the temperature at −50° C was maintained. The agitation and the bubbling of inert gas were maintained; then the reaction mixture was agitated for 4 more hours at −40° C while passing a current of acetylene therethrough. Then 3.5 gm of ammonium chloride were introduced into the reaction mixture and the temperature was raised to 0° C and the ammonia was removed. After 30 cc of water were added thereto, the reaction mixture was extracted with methylene chloride and the organic phase was washed with water until the wash waters were neutral, then dried, filtered and evaporated to dryness, to obtain 7.7 gm of a raw ethynyl derivative. The raw product was purified by chromatography through magnesium silicate and recrystallization from isopropylic ether to obtain 5.2 gm, (69 percent yield) of 3,3-dimethoxy-7α-methyl-17α-ethynyl-Δ$^{5(10),9(11)}$-estradiene-17β-ol in the form of a solid, colorless product, soluble in the usual organic solvents, and insoluble in water and in dilute aqueous acids and alkalis. The product obtained had a melting point of 130° C.

Infrared Spectra

Absence of C=0
Presence of OH at 3,590 cm$^{-1}$
Presence of C ■ CH at 3,300 cm$^{-1}$
Presence of 2 conjugated C=C bands at 1,643 cm$^{-1}$ and 1,612 cm$^{-1}$.

Step N: Preparation of 7α-methyl-17α-ethynyl-Δ$^{5(10),9(11)B}$-estradiene-17β-ol-3-one 6.1 gm of 3,3 -dimethoxy-7α-methyl-17α-ethynyl-Δ$^{5(10),9(11)}$-estradiene-17β-ol were suspended in 30 cc of acetic acid containing 5 per cent of water and the solution was agitated for 15 minutes at room temperature under an inert atmosphere. Then, 15 cc of water were added to the solution, which was again agitated for 15 minutes. Still at room temperature and under an inert atmosphere, 300 cc of a saturated aqueous solution of sodium bicarbonate were slowly added and the mixture was iced for 30 minutes and then filtered. The precipitate obtained was vacuum filtered, washed with water until the wash waters were neutral and dried under vacuum to obtain 5.2 gm of 7α-methyl-17α-ethynyl-Δ$^{5(10),9(11)}$-estradiene-17β-ol-3-one having a melting point of 226° C.

This compound occurred in the form of colorless crystalline needles, which were soluble in the usual organic solvents and insoluble in water and in dilute aqueous acids and alkalis.

Ultra-Violet Spectra (in ethanol)
inflection toward 237 mμ    $\xi_{1cm}^{1\%}$ = 610
λmax 241–242 mμ             $\xi_{1cm}^{1\%}$ = 630
inflection toward 250 mμ    $\xi_{1cm}^{1\%}$ = 440
inflection toward 290 mμ    $\xi_{1cm}^{1\%}$ = 4.7

This spectra characterized a heteroannular diene.

Infrared Spectra (chloroform)

Presence of OH at 3,590 cm$^{-1}$
Presence of C ■ CH at 3,300 cm$^{-1}$
Presence of non-conjugated ketone Step Preparation of 7α-methyl-17α-ethynyl Δ$^{4,9,11}$-estratriene-17β-ol-3-one 4 gm of 7α-methyl-17α-ethynyl-Δ$^{5(10),9(11)}$-estradiene-17β-ol-3-one, 100 cc of dichloroethane and then 8 gm of 2,3-dichloro-5,6-dicyano-p-benzoquinone were successively introduced into a three-neck flask under an inert atmosphere. The mixture was maintained under agitation for 20 hours at room temperature, after which the hydroquinone was separated and washed with dichloroethane. Next, the combined dichloroethane phases were washed first with a sodium bicarbonate solution, then with sodium bisulfite and finally with aqueous sodium chloride. The organic solution was dried, filtered and brought to dryness to obtain 3.6 gm of raw product, which was purified through silica gel and eluted with a mixture of chloroform and ethyl acetate. The eluate was dried and the residue obtained was recrystallized from a minimum of refluxing ethanol, then crystallized, iced, vacuum filtered, washed with water and dried to obtain a first yield of 595 mg of product having a melting point of 214° C. The concentration of the mother liquors yielded a further 197 mg of the product.

For the purpose of analysis, the product was once more recrystallized from ethanol at high and low temperatures.

The product, which was 7α-methyl-17α-ethynyl-$\Delta^{4,9,11}$-estratriene-17β-ol-3-one occurred in the form of colorless needles, which were soluble in alcohol, ether, acetone, benzene and chloroform, and insoluble in water. The said product had a melting point of 215° C and a specific rotation $[\alpha]^{20}_D = -38°$ (c = 0.5 percent in methanol).

Ultra-violet Spectra (in ethanol)
λmax. 238 mμ    $E_{1cm}^{1\%}$ = 202
inflection toward 271 mμ   $E_{1cm}^{1\%}$ = 123
λmax. 243 mμ    $E_{1cm}^{1\%}$ = 930   (ξ = 28.700)

This compound is not described in the literature.

EXAMPLE II

Preparation of 7α,17α-dimethyl-$\Delta^{4,9,11}$-estratriene-17β-ol-3-one

Step A: Preparation of 3,3-dimethoxy-7α,17α-dimethyl-$\Delta^{5(10),9(11)}$-estradiene-17β-ol 1.732 gm of 3,3-dimethoxy-7α-methyl-$\Delta^{5(10),9(11)}$-estradiene-17β-one, (obtained in Step L of Example I) dissolved in 90 cc of anhydrous benzene were added to 110 cc of a 2.3 M titrating solution of magnesium methyl bromide in ether and cooled to about 0° C within the space of 20 minutes. The reaction mixture was agitated for 20 hours at room temperature. Then the reaction mixture was poured into a saturated aqueous solution of ammonium chloride, iced, decanted, then washed with water until the wash waters were neutral, dried and finally evaporated to dryness under vacuum to obtain 2.045 gm of 3,3-dimethoxy-7α,17α-dimethyl-$\Delta^{5(10),9(11)}$-estradiene-17β-ol, which product was used as such for the next step of the synthesis.

Ultra-Violet Spectra (in ethanol)

λmax. 243 mμ ξ= 17,400

The product was insoluble in water and in dilute aqueous acids and alkalis, and soluble in most of the common organic solvents.

Step B: Preparation of 7α,17α-dimethyl-$\Delta^{5(10),9(11)}$-estradiene-17β-ol-3-one 2 gm of 3,3-dimethoxy-7α,17α-dimethyl-$\Delta^{5(10),9(11)}$-estradiene-17β-ol were introduced under an inert atmosphere into 10 cc of a 5 percent acetic acid solution. The mixture was agitated for 15 minutes and after 5 cc of water were added, the agitation was continued for 15 minutes more. Then the reaction mixture was slowly poured into a saturated solution of sodium bicarbonate and extracted with methylene chloride. The extract obtained was washed with water, dried, evaporated to dryness to obtain 1.77 gm of 7α,17α-dimethyl-$\Delta^{5(10),9(11)}$-estradiene-17β-ol-3-one. This compound was used as such for the next step of the synthesis.

Ultra-Violet Spectra (in ethanol)

λMAX. 241 mμ ξ= 14,900

The product was insoluble in water and in dilute aqueous acids and alkalis and soluble in most of the usual organic solvents.

Step C. Preparation of 7α,17α-dimethyl-$\Delta^{4,9,11}$-estratriene 17β-ol-3-one Under agitation and under an atmosphere of nitrogen, 1.6 gm of 7α,17α-dimethyl-$\Delta^{5(10),9(11)}$-estradiene-17β-ol-3-one was dissolved in 32 cc of anhydrous dioxane, then 2.4 gm of 2,3-dichloro-5,6-dicyano-pobenzoquinone were added thereto, and the reaction mixture was allowed to stand for 28 hours at room temperature. Thereafter, the mixture was filtered, and the filtrate was washed first with a saturated aqueous solution of sodium bicarbonate and then with water. The organic phase was dried and evaporated to dryness. The residue was taken up with methylene chloride and filtered through magnesium silicate.

The filtrate, evaporated to dryness, was subjected to chromatography through magnesium silicate with elution with methylene chloride containing 2 percent of acetone. The eluate was evaporated to dryness. The residue was crystallized from ethanol to obtain 175 mgm of 7α,17α-dimethyl-$\Delta^{4,9,11}$-estratriene-17β-ol-3-one, having a melting point of 173° C and a specific rotation $[\alpha]^{20}_D = -125°$ (c = 0.57 percent in methanol).

The product occurred in the form of prisms which were insoluble in water and in dilute aqueous acids and alkalis, and soluble in most of the common organic solvents.

Analysis:      $C_{20}H_{26}O_2$;        molecular weight = 298.41
Calculated:   C 80.49%   H 8.78%
Found:            80.5            8.7

Ultra-Violet Spectra (ethanol)

λmax. 343 mμ ξ= 27,800

Various modifications of the compositions and process of the invention may be made without departing from the spirit or scope thereof, and it is to be understood that the invention is to be limited only as defined in the appended claims.

We claim:

1. A process for the preparation of 7α-methyl-Δ 4,9,11-estratrienes of the formula

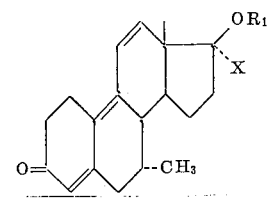

wherein X is selected from the group consisting of alkyl of one to seven carbon atoms and unsaturated aliphatic and halogenated unsaturated aliphatic radicals of two to four carbon atoms which comprise subjecting a 5-lower alkylene ketal-17β-acyloxy-des-A-Δ$^{9(11)}$estrene wherein the acyloxy is derived from an organic carboxylic acid of one to 18 carbon atoms to hydration to form the corresponding 5-lower alkylene ketal-17β-acyloxy-des-A-estrane-11α-ol, subjecting the latter to acid hydrolysis to form 17β-acyloxy-des-A-estrane-11α-ol-5-one, reacting the latter with a formylation agent to form 11α-formyloxy-17β-acyloxy-des-A-estrane-5-one, brominating the latter to form 6ξ-bromo-11α-formyloxy-17β-acyloxy-des-A-estrane-5-one, dehydrobrominating the latter to form 11α-formyloxy-17β-acyloxy-des-A-Δ$^6$-estrene-5-one, which can be saponifyed under alkaline conditions to form 17β-acyloxy-des-A-Δ$^6$-estrene-11α-ol-5one, reacting the latter or the 11α-formyloxy derivative with a methyl magnesium halide in the presence of a copper salt to form 7α-methyl-17β-acyloxy-des-A-estrane-11α-ol-5one, reacting the latter with an esterifying derivative of an organic sulfonic acid to form 7α-methyl-11α-organosulfonyloxy-17β-acyloxy-des-A-estrane-5one, reacting the latter with a lithium halide in the presence of a dilower alkyl formamide to form 7α-methyl-17β-acyloxy-des-A-Δ$^9$-estrene-5one, saponifying the latter under alkaline conditions to form 7α-methyl-des-A-Δ$^9$-estrene-17β-ol-5one, oxidizing the latter to form 7α-methyl-des-A-Δ$^9$-estrene-5,17-dione, reacting the latter with a secondary amine to form the corresponding 5-enamino-7α-methyl-des-A-Δ$^{5(10),9(11)}$-estradiene-17-one, condensing the latter with 1,3-dichlorobutene —2 to form 3-chloro-7α-methyl-4,5-seco-Δ$^{2,9}$-estradiene-5,17-dione, hydrolyzing the latter under acid conditions to form 7α-methyl-4,5-seco-Δ$^9$-estrene-3,5,17-trione, cyclizing the latter in the presence of a secondary amine to form 3-enamino-7α-methyl-Δ$^{3,5(10),9(11)}$-estratriene-17-one, subjecting the latter to acid hydrolysis to form 7α-methyl-Δ$^{5(10),9(11)}$-estradiene-3,17-dione, reacting the latter with a ketalizing agent to form 3-dialkoxy-7α-methyl-Δ$^{5(10),9(11)}$-estradiene-17-one, reacting the latter with an organo metal compound to form 3-dialkoxy-7α-methyl-17α-X-Δ$^{5(10),9(11)}$-estradiene-17β-ol, wherein X has the above definition, subjecting the latter to acid hydrolysis to form 7α-methyl-17α-X-Δ$^{5(10),9(11)B}$-estradiene-17β-ol-3-one and reacting the latter with a substituted p-benzoquinone to form 7α-methyl-17α-X-Δ$^{4,9,11}$-estratriene-17β-ol-3-one.

2. The process of claim 1 wherein the 7α-methyl-17α-X-Δ$^{4,9,11}$-estratriene-17β-ol-3-one is reacted with an esterifying agent of an organic carboxylic acid of one to 18 carbon atoms to form the corresponding 7α-methyl-17α-X-17β-acyloxy-Δ$^{4,9,11}$-estratriene-3-one.

3. The process of claim 1 wherein the 5-lower alkylene ketal-17β-acyloxy-des-A-Δ$^{9(11)}$-estrene is reacted with diborane in an ether followed by reaction with hydrogen peroxide.

4. The process of claim 3 wherein the 17β-acyloxy-des-A-estrane-11α-ol-5-one is reacted with formic acid at elevated temperatures.

5. The process of claim 1 wherein the 11α-formyloxy-17β-acyloxy-des-A-estrane-5-one is reacted with bromine in an inert solvent and the 6ξ-bromo-11α-formyloxy-17β-acyloxydes-A-estrane-5-one is dehydrobrominated with a mixture of lithium carbonate and lithium bromide.

6. The process of claim 1 wherein the 11α-formyloxy- 17β-acyloxy-des-A-Δ$^6$-estrene-5-one is reacted with an alkali selected from the group consisting of alkali metal carbonates and bicarbonates in hot aqueous methanol.

7. The process of claim 1 wherein the 17β-acyloxy-des-A-Δ$^6$-estrene-11α-ol-5-one is reacted with a methyl magnesium halide in the presence of a cuprous halide.

8. The process of claim 1 wherein the 7α-methyl-17β-acyloxy-des-A-estrane-11α-ol-5-one is reacted with methane sulfonyl chloride to form 7α-methyl-11α-methane-sulfonyloxy-17β-acyloxy-des-A-estrane-5-one which is reacted with lithium bromide in dimethylformamide.

9. The process of Claim 1 wherein the 7α-methyl-17β-acyloxy-des-A-Δ$^9$-estrene-5-one is reacted with an alkali metal hydroxide to form 7α-methyl-des-A-Δ$^9$-estrene-17β-ol-5-one which is then oxidized with chromic anhydride.

10. The process of claim 1 wherein 7α-methyl-des-A-Δ$^9$-estrene-5,17-dione is reacted with a compound selected from the group consisting of pyrrolidine, piperidine, morpholine and dilower alkylamines and the resulting 5-enamino-7α-methyl-des-A-Δ$^9$-estrene-17-one is condensed with 1,3-dichlorobutene-2in dimethylformamide in the presence of an alkali metal iodide.

11. The process of claim 1 wherein 7α-methyl-4,5-seco-Δ$^9$-estrene-3,5,17-trione is cyclized with pyrrolidine.

12. The process of claim 1 wherein 7α-methyl-Δ$^{5(10),9(11)}$-estradeiene-3,17-dione is reacted with methanol in the presence of hydrochloric acid.

13. The process of claim 1 wherein the 3-diloweralkoxy-7α-methyl-Δ$^{5(10),9(11)}$-estradiene-17-one is reacted with potassium acetylide.

14. The process of claim 1 wherein 7α-methyl-17α-X-Δ$^{5(10),9(11)}$-estradiene-17β-ol-3-one is reacted with 2,3-dichloro-5,6-dicyano-p-benzoquinone.

* * * * *